United States Patent [19]

Chen

[11] 4,249,177
[45] Feb. 3, 1981

[54] TARGET DISCRIMINATION APPARATUS
[75] Inventor: Pin-Wei Chen, Sunnyvale, Calif.
[73] Assignee: The United States of America as represented by the Secretary of the Air Force, Washington, D.C.
[21] Appl. No.: 35,743
[22] Filed: May 3, 1979
[51] Int. Cl.³ .................................................. G01S 7/30
[52] U.S. Cl. .................................. 343/7 A; 343/5 CF
[58] Field of Search ............................ 343/5 CF, 7 A

[56] References Cited
U.S. PATENT DOCUMENTS

| | | | |
|---|---|---|---|
| 3,286,257 | 11/1966 | Trafford et al. | 343/5 CF X |
| 3,374,479 | 3/1968 | Moore | 343/5 CF X |
| 3,680,095 | 7/1972 | Evans | 343/7 A X |
| 3,829,858 | 8/1974 | Bergkvist | 343/7 A |
| 3,836,964 | 9/1974 | Evans | 343/7 A X |
| 3,975,730 | 8/1976 | Maeda et al. | 343/7 A X |
| 3,995,270 | 11/1976 | Perry et al. | 343/5 CF X |
| 4,104,633 | 8/1978 | Donahue et al. | 343/7 A |

Primary Examiner—T. H. Tubbesing
Attorney, Agent, or Firm—Donald J. Singer; William Stepanishen

[57] ABSTRACT

The target discrimination apparatus utilizes logic circuit which is positioned between the detection window and the clutter averaging cells of a conventional constant false alarm rate (CFAR) radar detector to provide better estimation of the clutter average and therefore better target detection in the multiple target environment.

6 Claims, 1 Drawing Figure

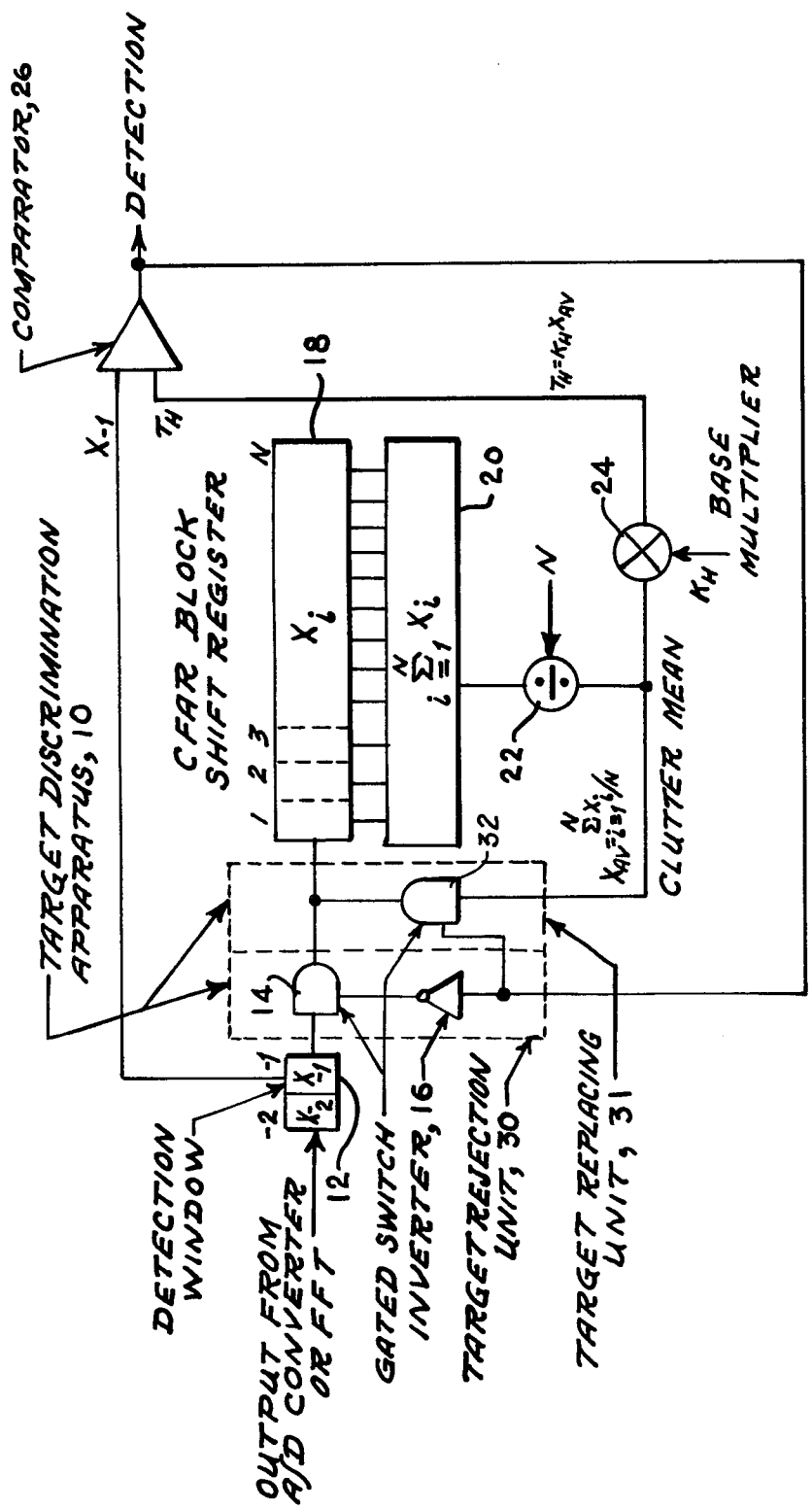

TARGET DISCRIMINATION APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to constant false alarm rate radar detector apparatus, and in particular to a target discrimination apparatus for a constant false alarm rate radar detector.

For the conventional adaptive CFAR detector circuitry, the signal in the detection window is compared to the threshold value which is the product of the base multiplier and the clutter average in the CFAR block. A report or target candidate is declared if the result of comparison is positive. There is a problem for the conventional adaptive detector which fails to accommodate the target-to-target interference as targets pass through the clutter cells in the detector. The clutter cells are usually referred to as a CFAR block which forms the clutter average. When the target enters the CFAR block, the target signal will raise the clutter average and degrade the ability to detect the nearby target incidently located in the detection cell. The detection degradation due to the target interference has been found to be unacceptable especially if radar operates in very heavy target environments. A target with signal to noise ratio of 20 dB will yield 1.5 dB detection degradation if target occupies only 2 percent of CFAR block. The degradation is found to be even more severe if target range extent or amplitude is large. Multiple targets such as a fleet of naval vessels or aircraft are not unusual in the real radar environment. Previous attempts to alleviate the target interference include the technique of increasing the CFAR block size. However, the technique can only alleviate but not totally eliminate the interference effect. Furthermore, there are some cases (for example high pulse repetition frequency) where the CFAR block cannot be extended. Introducing a target discrimination apparatus into the automatic adaptive one-sided CFAR circuitry will solve the problem. The uniqueness of this apparatus will prevent the candidate target from moving into the CFAR block. Thus, the clutter average calculated from the CFAR block will not be contaminated by the target and no detection loss will result from the presence of multiple targets.

SUMMARY OF THE INVENTION

The present invention utilizes a target discrimination apparatus in a constant false alarm rate detector. The target discrimination apparatus consists of target rejection and target replacing logic units. The target rejection logic unit comprises a gated switch which is connected between the target detection window and the CFAR block unit and is controlled by the complement of the target detection output from the CFAR detector output. The target replacing logic unit comprises a gated switch which is connected between the clutter average output and the CFAR block unit and is controlled by the target detection output from the CFAR comparator output.

It is one object of the present invention, therefore, to provide a new and improved target discrimination apparatus.

It is another object of the invention to provide an improved target discrimination apparatus wherein the mutual interference of multiple targets is substantially reduced.

It is yet another object of the invention to provide an improved target discrimination apparatus having greater target recognition in heavy target environments.

It is a further object of the invention to provide an improved target discrimination apparatus giving better estimation of the clutter average in the target environment.

These and other advantages, objects and features of the invention will become more apparent after considering the following description taken in conjunction with the illustrative embodiment in the accompanying drawings.

BRIEF DESCRIPTION OF THE DRAWING

The sole FIGURE is a block diagram of the target discrimination apparatus according to the present invention.

DESCRIPTION OF THE PREFERRED EMBODIMENT

Referring now to the FIGURE there is shown a target discrimination apparatus 10 in a single-sided constant false alarm rate (CFAR) unit.

The target discrimination apparatus 10 consists of target rejection 30 and target replacing 31 logic units. The target rejection logic unit 30 comprises a gated switch 14 which is positioned between the detection window 12 and the CFAR block shift register 18 and is controlled by the output of an inverter 16 whose input is the detection output. The target replacing logic unit 31 comprises another gated switch 32 which is positioned between the clutter average output and the CFAR block shift register 18 and is directly controlled by the detection output. An input signal is received at the detection window 12. The summary unit 20 which receives the output from the CFAR shift register 18 is connected to comparator unit 26 through divider unit 22 and multiplier unit 24. The detection window 12 also provides a signal to the comparator unit 26. The detector signal from the output of the comparator unit 26 is considered as the detection output which controls the gated switches 14 and 32.

The operation of the target discrimination apparatus in an adaptive CFAR detector unit will herein be described.

In the radar receiver, the radar signal is envelope-detected and A/D converted. For a pulse doppler radar, the A/D converted signal is further analyzed by the Fast Fourier Transform FFT. The output of the A/D converter or FFT is loaded into a shift register and clocked along the register. The contents of each cell in the register is the amplitude output for a single range cell. The first few cells are designated as the detection window 12 and the rest are designated as the CFAR block 18. The output $X_i$ from N cells in the CFAR block are summed and the result is next divided by the total number of cells, N, in divider 22 to provide a measurement of the clutter average/mean, $X_{av}$. This mean is then multiplied by a base multiplier 24 by a factor of $K_H$ to provide a threshold $T_H$ and then to an amplitude comparator 26 to determine whether the signal amplitude to be examined, $X_{-1}$ in detection window 12 exceeds $T_H$. The target discrimination apparatus 10 comprises a first and second gated switch 14, 32 and an inverter 16. The target discrimination apparatus 10 is connected between the detection window 12 and the CFAR block 18. The output of the detection comparator 26 is connected to the input of inverter 16. The clutter average/mean, $X_{av}$ is applied to the input of gated switch 32. If the signal amplitude $X_{-1}$ in the detection window 12 exceeds the threshold $T_H$, detection is declared or a one (1) is loaded in the output of the detection comparator 26. This one (1) triggers the inverter 16 which then switches off the gated switch 14. In the next clock period, this will prevent the target amplitude in the detection window 12 from moving into the first register position in the CFAR block 18. In the mean time, the detection will turn on the gated switch 32 which will automatically allow the clutter average to fill in the first register position in the CFAR block 18.

Once the target passes through the detection window 12, the output of the detection comparator 26 returns to zero which will energize the inverter 16 and turn on the gated switch 14 and turn off the gated switch 32 thus, resuming normal CFAR operation.

Implementation of the target discrimination apparatus 10 in the adaptive detector will prevent the target moving into the CFAR block and therefore preserve the clutter mean estimation free from target contamination.

Therefore, there will be no detection degradation during the operation of the target discrimination apparatus 10 in heavy traffic environment. The FIGURE shows the simple single sided CFAR adaptive detector with the target discrimination circuit. It should be pointed out that this simple adaptive detector is not CFAR in non-Rayleight clutter. If CFAR is desired for varying clutter statistics in Weibull or Log-Normal clutter, the dynamic (doubly) adaptive single-sided CFAR adaptive detector with target discrimination circuit may be used. The advantages of using dynamic (doubly) adaptive CFAR circuitry is to insure CFAR by allowing the base multiplier value $K_H$ to change as the clutter statistics vary. The target discrimination apparatus circuit will operate in the same manner as described for the above circuit.

The uniqueness of the target discrimination apparatus is to prohibit target-clutter interference, to insure a CFAR characteristic, and a no detection degradation under multiple target situations.

The operation of this apparatus may be further improved by changing the detection cell in the window from register position (−1) to register position (−2) and inhibiting the gated switch during the last two clock periods. The merit of this change is to further inhibit the self suppression effect due to an extended maritime target entering into the CFAR block.

Although the invention has been described with reference to a particular embodiment, it will be understood to those skilled in the art that the invention is capable of a variety of alternative embodiments within the spirit and scope of the appended claims.

What is claimed is:

1. A target discrimination apparatus for a constant false alarm rate detector comprising in combination:

A CFAR detector means to receive a digital input signal, said CFAR detector means comprising a constant false alarm rate detector, said CFAR detector means having a detection window, said detection window comprising a plurality of detection cells, said detection window providing a target signal, said CFAR detector means having a plurality of clutter cells to receive target clutter data from said digital input signal, said CFAR detector means averaging said target clutter data to a clutter average signal to provide a clutter threshold signal, comparator means comparing said clutter threshold signal and said target signal to detect a target, said comparator means providing a detection signal when said target signal exceeds said clutter threshold signal, and, a target discrimination means connected between said detection window and said plurality of clutter cells, said target discrimination means receiving said detection signal, said target discrimination means in response to said detection signal prevents said target signal from entering said plurality of clutter cells, once said target signal passes through said detection window, said CFAR detector means enables said target discrimination means to pass target clutter data to said plurality of clutter cells.

2. A target discrimination apparatus as described in claim 1 wherein said target discrimination means comprises in combination a gated switch connected between said detection window and said plurality of clutter cells, and, an inverter connected to said gated switch to control switch operation, said inverter receiving said detection signal to open said gated switch.

3. A target discrimination apparatus as described in claim 1 wherein said CFAR detector means is adaptive for Rayleigh clutter.

4. A target discrimination apparatus as described in claim 1 wherein said CFAR detector means is doubly adaptive for non-Rayleigh clutter.

5. A target discrimination apparatus as described in claim 1 wherein said detection window comprises a first and second detection cell.

6. A target discrimination apparatus as described in claim 1 wherein said second detection cell is selected to provide said target signal.

* * * * *